Nov. 25, 1947. G. R. BICKNELL ET AL Re. 22,937

SLEEVE PRESS

Original Filed Feb. 7, 1941

INVENTORS
GEORGE R. BICKNELL
FRED A. HEIDENFELDER
BY
Hyde and Meyer
ATTORNEYS

Reissued Nov. 25, 1947

Re. 22,937

UNITED STATES PATENT OFFICE 22,937

SLEEVE PRESS

George R. Bicknell, Antioch, Ill., and Fred A. Heidenfelder, Whitewater, Wis., assignors to The American Laundry Machinery Company, Norwood, Ohio, a corporation of Ohio Original No. 2,365,448, dated December 19, 1944, Serial No. 377,926, February 7, 1941. Application for reissue July 18, 1947, Serial No. 761,902

6 Claims. (Cl. 38—12)

This invention relates to improvements in a press particularly adapted for ironing the sleeves of men's shirts.

An object of the present invention is to provide a press having a pair of beds or bucks adapted to receive simultaneously the two sleeves of a shirt from the shoulder to the cuff, laid flat and of double thickness, together with a coacting head to press these sleeves simultaneously.

Another object of the invention is to provide novel means for clamping the cuff end of a sleeve so as to assist in the smooth lay of the sleeve, to hold the plackets in proper position for ironing, and to hold the cuff portion of the sleeve away from the heated head or chest so as to prevent drying of the cuff.

Another object of the present invention is to provide novel clamping means associated with a pressing buck, together with novel means for releasing the clamp as the press closes. The invention also provides a plurality of clamps adapted to be placed individually in holding or release position, together with power means for simultaneously releasing all clamps.

Other objects and advantages of the present invention will appear from the accompanying drawings and specifications and the essential features will be summarized in the claims.

Figure 1:
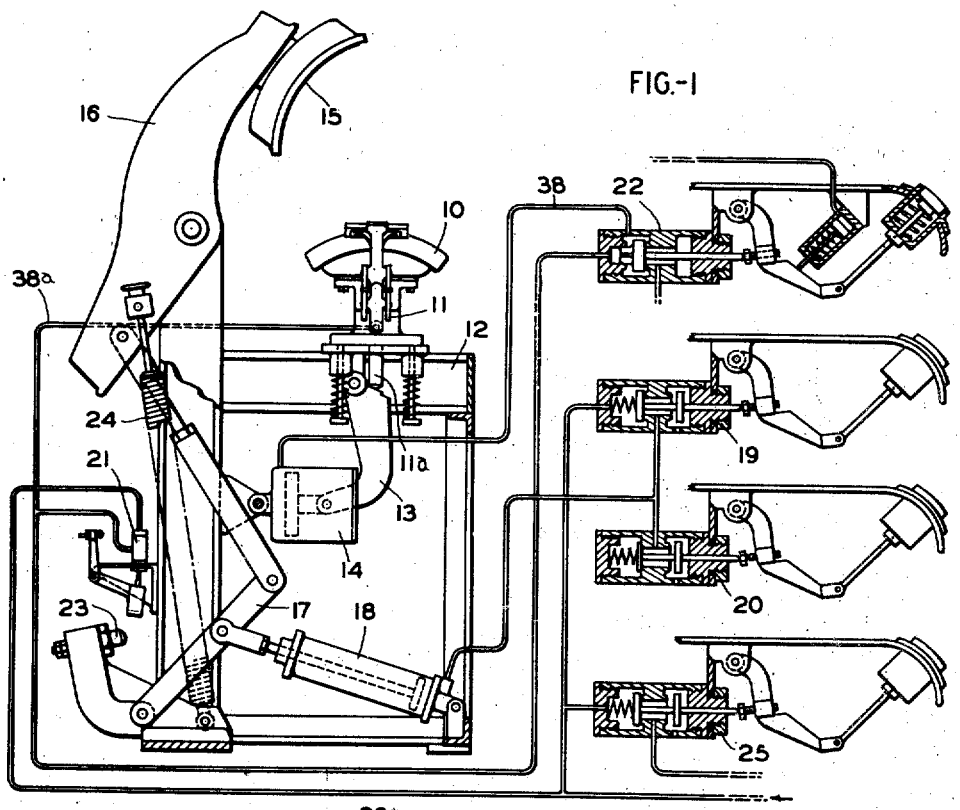
Figure 2:
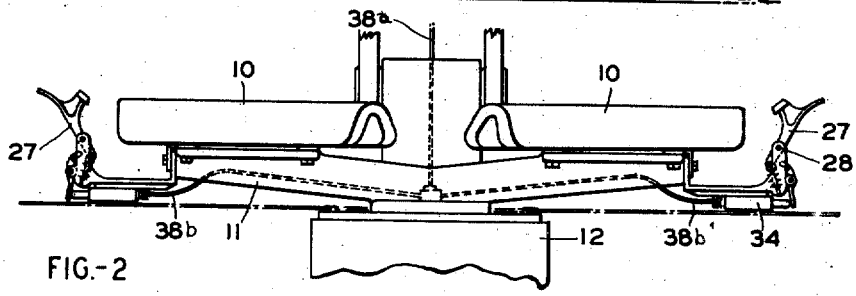
Figure 3:
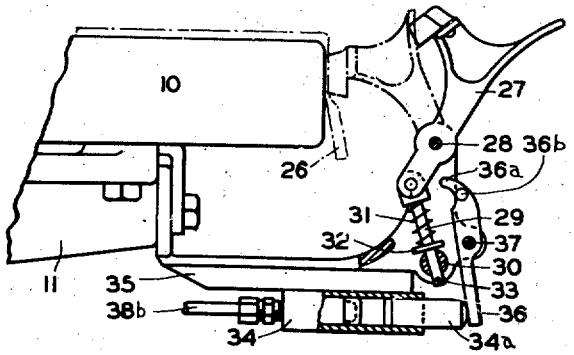
Figure 4:
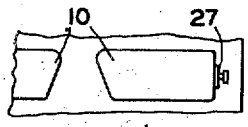

In the drawings, Fig. 1 is a side elevation of a pressing machine embodying our invention, with control mechanism therefor shown diagrammatically; Fig. 2 is a fragmental front elevation of the press of Fig. 1, showing the beds and associated clamps; while Fig. 3 is an enlarged fragmental view of a portion of Fig. 2 with parts broken away to more clearly show the operating parts. Fig. 4 is a small fragmental top plan view of the beds.

Since our invention is applicable to various types of pressing mechanism a very brief description of the mechanism of Fig. 1 will be sufficient. The pressing beds or bucks 10 are rigidly mounted on a pedestal 11 which is in turn mounted for vertical movement in the frame 12. A pin 11a extends downwardly in position to be engaged by a bell crank 13 operable by fluid motor 14. A heated pressing head 15 complementary to the bucks 10 is mounted on hand lever 16 and oscillatable by a toggle 17 which is actuated by fluid motor 18. When it is desired to close the press, valves 19 and 20 are moved to fluid supply position causing motor 18 to straighten toggle 17 carrying the pressing head 15 to position above the bucks 10. When the toggle 17 reaches a strut-forming position it opens valve 21 so as to supply fluid through normally open valve 22 to motor 14 causing the bucks to move upwardly against the pressing heads. To open the press, valve 22 is momentarily moved to cut off the flow of fluid to motor 14, whereupon a spring pressed plunger 23 and a spring 24 cause the pressing head to open. The valve 25 is a tandem valve for opening another press and has no connection with the present invention.

The bucks 10 are preferably flat or convex upwardly as here shown and each adapted to receive the sleeve of a man's shirt from the shoulder to the cuff. Ordinarily each buck is longer than it is wide and they are assembled in longitudinal alinement with sufficient spacing between them to permit the body of the shirt to lie below the top surface of the bucks 10 while the sleeves are being ironed. Clamping means to be presently described is provided at the outer end of each buck and in operation the cuff of a sleeve is first held beneath the clamp as indicated at 26 in Fig. 3, after which the sleeve is laid flat along the top of the buck, stretching the same away from the clamped end so as to arrange the plackets of the sleeve facing upwardly and in smooth condition for ironing. When both sleeves have been laid in this manner with the body of the shirt folded down between and below the bucks 10, the pressing head 15 is brought down and the press is sealed for a sufficient length of time to iron the sleeves.

It will be noted in Fig. 4 that in top plan view the bucks 10 are in longitudinal alignment but their inner ends are inclined in a front to rear direction so as to provide a buck of different length at the front and rear of the press. Also the longer portion of the right-hand buck is in longitudinal alignment with the longer portion of the left-hand buck, and similarly the shorter portions of the bucks are in alignment. The bucks 10 are of a width from front to rear which is wider than the sleeve of a shirt and the length of the rear portion of the buck will accommodate a long sleeve from the cuff to the shoulder seam while the front portion of the buck will support a shorter sleeve from the cuff to the shoulder seam. In other words, the difference in length between the front and rear portions of a buck is of the order of several inches so as to take care of the range of sleeve lengths normally encountered. It results from this construction that with the body of the shirt lying between the bucks 10 each sleeve may be laid along one of the bucks with the shoulder seam aligned along the inclined inner end edge of each buck and this may be done with a wide range of shirt sizes and sleeve lengths.

This eliminates the necessity of pressing into and distorting the body of the shirt during the sleeve pressing operation with the subsequent necessity for re-dampening of those body portions on that account. Also a simple rigid buck of fixed shape is nevertheless adapted for the pressing of shirt sleeves of different lengths.

The clamping means comprises two identical clamps located at the outer ends of the bucks 10 and one only will be described. The clamp 27 is pivotally mounted at 28 in a fixed bracket 35 connected with the pedestal 11. Below the pivot 28 a link 29 is pivotally connected with the clamp 27. This link passes freely through an opening in shaft 30 and the spring 31 is engaged between collar 32 and the head of the links so as to normally urge the head of the link upwardly. This provides an over-center device so that the clamp 27 will remain either in the full line or dot-dash line position of Fig. 3, after being so placed. A stop pin 33 limits the movement of the clamp in its open position.

Preferably power means is provided for opening the clamp and in the present instance this comprises a small servomotor 34 carried by the bracket 35. The servomotor has a piston **34*a* which engages the lower arm of a release lever 36 which is pivotally mounted in the bracket 35 at the point 37. This lever has a nose 36*a* adapted to engage clamp 27 below pivot 28 when the clamp is in holding position and to move the clamp to open position when fluid is supplied to the servomotor. A stop pin 36*b* engages bracket 35 to limit movement of lever 36** in clamp-releasing direction.

Preferably means is provided for opening the clamps 27 just before the press closes. For this purpose the conduit system 38 which supplies fluid to motor 14 for finally closing the press is provided with a branch **38*a* which conducts fluid through two branches 38*b* to the servomotors 34. Because, by way of their conduits, the servomotors 34 are nearer to the valve 21 than servomotor 14, and further, because servomotors 34, both singly and collectively, are of such small volumetric capacity as compared with the large pressure motor 14, and also on account of their lesser duty or load, pressure will build up in and move over the pistons of the servomotors 34 almost instantaneously and well before operation of motor 14 is completed, thereby to move the clamps 27** away from their clamping position and toward their release position before the press is finally closed under full pressure.

In operation, the clamps 27 are moved manually by the operator from the full line position of Fig. 3 to the dot-dash position thereof against the cuff 26 of each shirt sleeve when arranging the lay of the sleeves on the bucks 10. The operator then pinches the shoulder at the exact folding line while grasping the other seam at the arm pit and draws the seam taut across the buck. This not only facilitates making a rapid and smooth lay but indexes the sleeve crease to coincide with the shoulder crease which is later made during a folding operation. The press is then closed and just before the motor 14 moves the bucks into final engagement with the pressing head, fluid is supplied through conduit **38*a* and conduits 38*b* simultaneously to the servomotors 34 causing lever 36 to move each clamp to the open position as shown in full lines in Figs. 2 and 3. Motor 14** then operates to apply final pressure.

It results from this construction that the cuff end of the sleeve is firmly held while the operator makes the lay of the sleeve and the cuff is held away from the heated pressing heads, but the clamps are automatically released when the press is closed so that upon completion of the pressing or ironing operation the operator may remove the sleeves from the press without delay.

What we claim is:

1. A garment pressing machine, comprising relatively movable head and bed members, means for causing relative approach of said members to a closed position short of final pressure between them, separate means for causing further approach of said members to final pressure position, a releasable work clamp movable at will by the operator into work clamping relation with the bed member, and means for releasing said work clamp, said last named means being responsive to operation of said first named means, whereby the clamp is released prior to the application of final pressure.

2. A garment pressing machine, comprising relatively movable head and bed members, means for moving the head member down to a closed position close to the bed, means for raising the bed member into full pressure relation with the head member, a releasable work clamp movable at will by the operator into work clamping relation with the bed member, and means for releasing said work clamp actuated by operation of said head moving means, whereby the clamp is released prior to the application of final pressure.

3. A garment pressing machine, comprising cooperating relatively movable head and bed members, each movable toward and from the other, a releasable work clamping member movable into and out of work clamping relation with the bed member, a motor for operating the head member to close the press, a motor for releasing the work clamp, a motor for operating the bed member to apply ironing pressure to the work, and control means for serially energizing said motors in the order named, whereby the work clamp is released before final pressure is applied to the work.

4. A garment pressing machine, comprising cooperating relatively movable head and bed members, each movable toward and from the other, a releasable work clamping member movable into and out of work clamping relation with the bed member, a motor for operating the head member to close the press, a motor for releasing the work clamp, a motor for operating the bed member to apply ironing pressure to the work, a controller for energizing the first named motor to close the press, and a second controller actuated by press closing movement and arranged to first energize the second named motor to release the work clamp and to then energize the third named motor to apply final pressure to the work.

5. In a pressing machine, an elongated buck adapted to receive a shirt sleeve laid flat from the shoulder to the cuff, a clamp at the cuff end of said buck for holding the cuff of a sleeve on said buck, a pressing head coacting with said buck to iron a sleeve thereon, power means for producing relative motion between said head and buck, power means for releasing said clamp, a common power system for both of said power means, and a single control means for energizing said power system.

6. In a pressing machine, an elongated buck adapted to receive a shirt sleeve laid flat from the shoulder to the cuff, a clamp at the cuff end of said buck for holding the cuff of a sleeve on said buck, a pressing head coacting with said buck to iron a sleeve thereon, a fluid actuated motor for producing relative motion between said head and buck, a fluid motor for releasing said clamp, a common conduit connected with a source of pressure fluid and having branches leading to said motors, a common conduit communicating with a source of pressure fluid and having two branches connected respectively to said two motors, said branches and the motors connected thereto being so formed and related to each other as to cause operation of the clamp releasing motor prior to completion of the operation of the other motor, and means for controlling fluid flow to said branches through said common conduit.

GEORGE R. BICKNELL.
FRED A. HEIDENFELDER.

REFERENCES CITED

The following references are of record in the file of this patent:

FOREIGN PATENTS

| Number | Country | Date |
|---|---|---|
| 447,276 | Great Britain | May 14, 1936 |